June 19, 1962

P. A. ROBIN 3,040,174

DEVICE FOR IMMOBILIZING INFANTS FOR
TAKING X-RAYS AND THE LIKE

Filed Dec. 17, 1958

INVENTOR
PERCIVAL A. ROBIN

BY *Hubbell and Cohen*

ATTORNEYS.

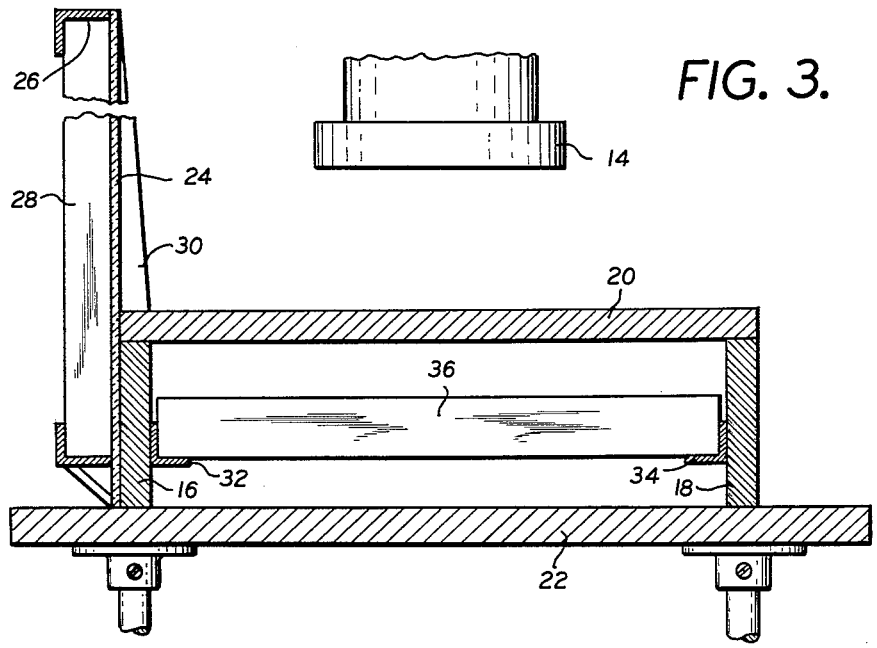
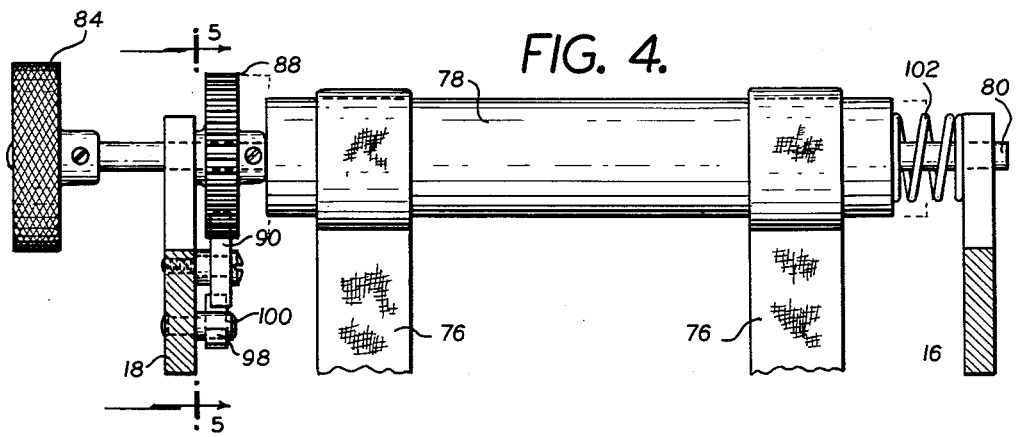
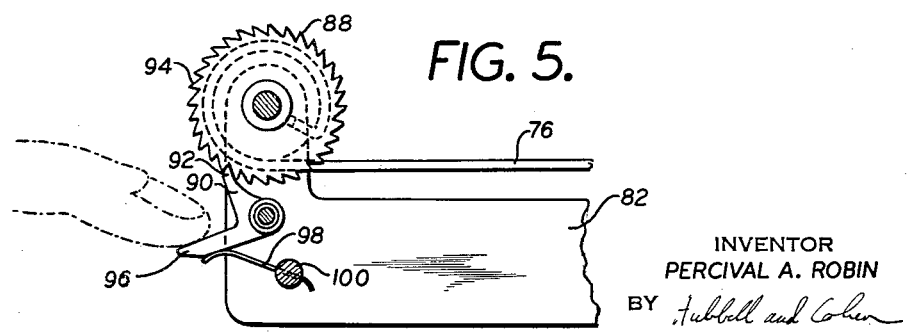
INVENTOR
PERCIVAL A. ROBIN

United States Patent Office 3,040,174
Patented June 19, 1962

3,040,174
DEVICE FOR IMMOBILIZING INFANTS FOR
TAKING X-RAYS AND THE LIKE
Percival A. Robin, Manhasset, N.Y.; Dorothea S. Robin,
76 Andrew Road, Manhasset, N.Y., executrix of said
Percival A. Robin, deceased
Filed Dec. 17, 1958, Ser. No. 781,129
3 Claims. (Cl. 250—58)

This invention relates to a diagnostic device and particularly to a device for immobilizing children during X-ray exposure.

The X-raying of children either for diagnostic or therapeutic purposes has been a difficult problem. Unlike adults, children will not remain stationary and immobile for periods of time sufficient to obtain sharp X-ray photographs when X-ray apparatus is used as a diagnostic instrument nor will they remain immobilized for sufficient periods of time to expose preselected portions of their bodies to X-rays for therapeutic purposes. Accordingly, when an X-ray apparatus is used as a diagnostic instrument physicians and X-ray technicians have been required to take large numbers of pictures to assure that at least some will be clear as movement of the child results in a cloudy or unclear picture. With respect to X-ray therapy, it is always undesirable to expose healthy tissue to large doses of X-rays. If a child does not remain still during exposure the chances of healthy tissue being exposed to unduly large quantities of X-rays is greatly increased. Thus, the failure of children to remain immobilized during X-raying presents a danger to the child and further presents a time consuming problem to the physician or technician.

One object of the present invention is the provision of a device which may be used in conjunction with an X-ray apparatus to immobilize a child during X-raying.

Another object of the present invention is the provision of a device for immobilizing a child during X-raying, which device will hold the child in several pre-selected positions eminently suited for different types of X-ray pictures.

The above and other objects, characteristics and features of the present invention will be more fully understood from the following description taken in connection with the accompanying illustrative drawings.

In the drawings:

FIG. 3 is a sectional view taken along the line 3—3 of FIG. 2;

FIG. 4 is a sectional view taken along the line 4—4 of FIG. 2; and

FIG. 5 is a sectional view taken along the line 5—5 of FIG. 4.

Figure 1:
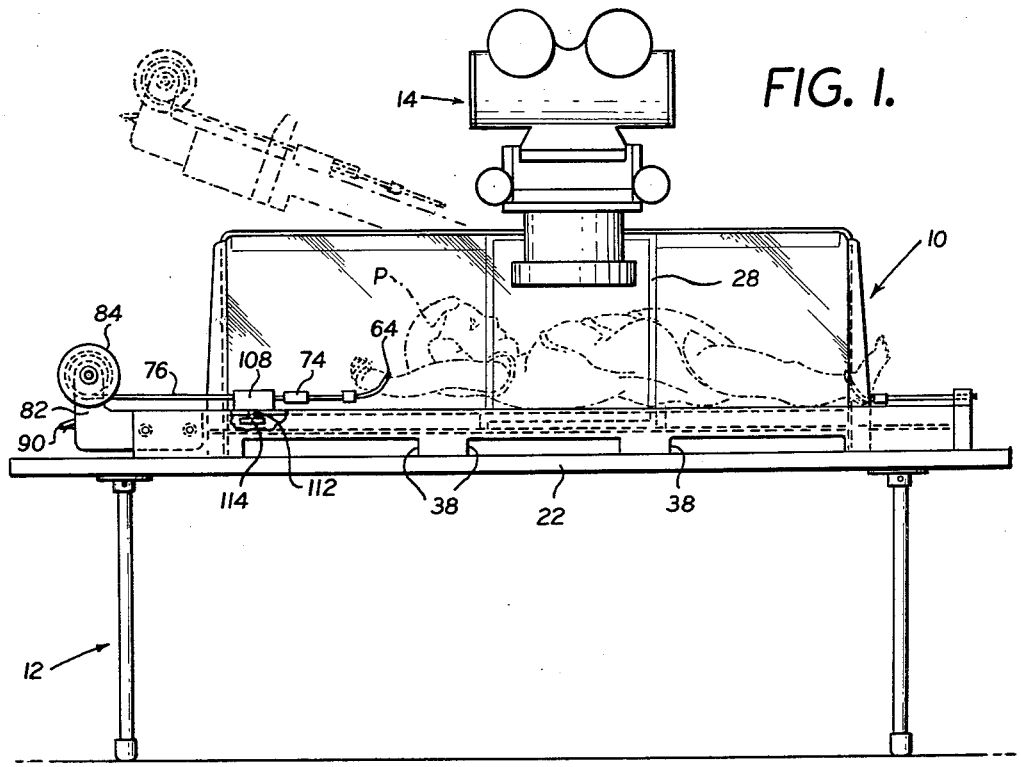
FIG. 1 is a side elevational view of a device for immobilizing children during X-raying.

Referring now to the drawings in detail, the device for immobilizing infants is generally designated by the reference numeral 10. As shown herein the device is supported by a conventional table 12 and is positioned in close proximity to an X-ray apparatus 14.

The device 10 comprises two longitudinally extending side members 16 and 18 which support a horizontal supporting member 20 in parallel spaced relation with the top 22 of the table 12. Fixed to the side member 16 in any suitable manner, as by nuts and bolts, rivets or adhesive, is an upstanding radiolucent channel member 24 which defines a track 26 for a tray 28 adapted to hold an X-ray cassette. The channel 26 may be reinforced as by vertical members 30. Fixed to the confronting surfaces of the longitudinal side members 16 and 18 in any suitable manner, as by rivets, screws, adhesives and the like, are two angle members 32 and 34, respectively, which members between them provide a track for a tray 36 which is adapted to support an X-ray film cassette therein.

Both the trays 28 and 36 are slidably movable longitudinally of the device 10 in their respective tracks. As the tray 28 is readily accessible to the physician or technician from the back of the device 10 sliding movement of tray 28 may be readily effected by merely grasping the tray and pushing it to any desired location. Access to the tray 36, however, is not readily available as the tray 36 is disposed between the top surface 20 of device 10 and the table top 22. In order to provide access for sliding the tray 26 side portion 18 is provided with spaced cut-outs 38 which are proportioned to permit the operator to slide his hand through cut-outs 38 between the table top 22 and the top surface 20 device 10 so as to grasp the tray 36 and move it to its desired location.

The patient P is disposed on the translucent top surface 20 in a reclining position. To immobilize the patient's feet two foot holders 40 and 42 are provided. As shown herein each of the foot holders 40 and 42 is formed from a looped elastic band or "shock cord" 44 which passes through members 46 provided with two apertures 48 and 50 to permit the passage of the band. The free ends 52 and 54 of the looped band 44 pass through apertures 56 and 58, respectively, in a vertical member 60 and are either knotted or in other ways enlarged to fix the free ends to side vertical member 60. The apertures 48 and 50 in the members 46 are proportioned so that members 46 remain in position by friction but sliding movement of the side members relative to the looped bands 44 can be effected by the application of force. Accordingly, when it is desired to place foot holder 40 around a patient's foot the member 46 may be slidably moved relative to the loop 44 toward the free ends thereof so as to enlarge the opening defined by the looped band 44 and the member 46. The patient's foot may then be inserted through the opening and then members 46 may be moved relative to the looped band 44 away from the free ends thereof to close the opening so as to securely hold the patient's foot.

The hands of the patient are held by hand holders 62 and 64. Each hand holder is also formed from a looped band 66 which passes through apertures 68 and 70 of a slidable member 72 and the free ends of looped bands 66 are secured to a block 74 in any suitable manner. To dispose a patient's hand in one of the hand holders the operation is substantially the same as that for the feet. Namely, the member 72 is moved relative to the loop 66 towards the free ends thereof to enlarge the opening defined by the loop 66 and the member 72. The hand is then passed through the opening and thereafter the member 72 is moved away from the free ends of the loop to close the opening and thus hold the hands.

Figure 2:
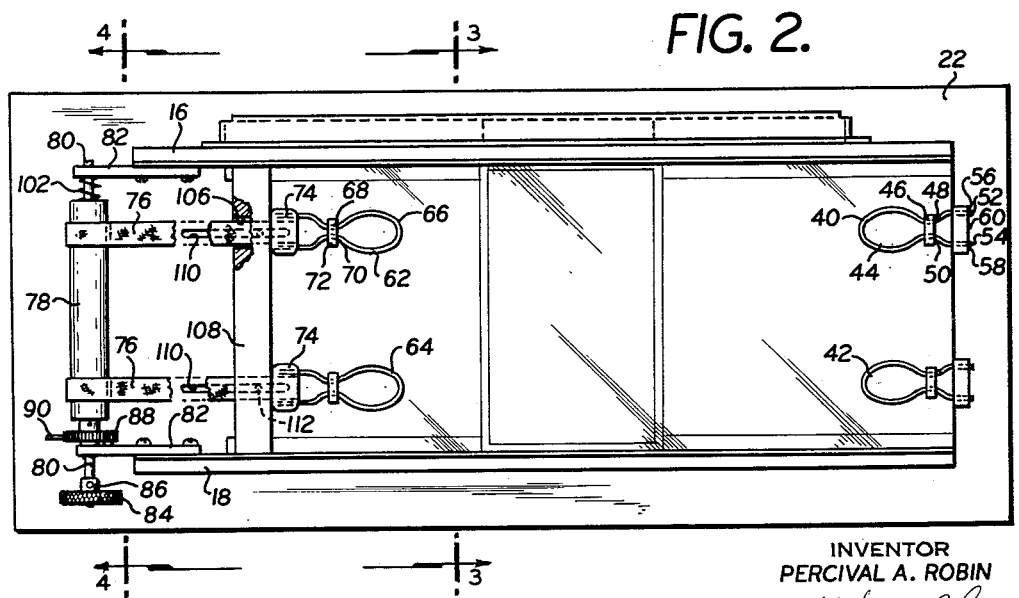
FIG. 2 is a top plan view of said device.

To compensate for the differences in height (length) of the patient the position of the hand holders 62 and 64 are adjustably positionable relative to the foot holders 40 and 42. The adjustable positioning is accomplished by fixing each block 74 for the hand holders to a strap 76 which is fixed to a rotatable cylinder 78. Cylinder 78 is mounted on a shaft 80 which is journaled in brackets 82 on the side members 16 and 18. Means are provided for rotating the cylinder 78 to thereby roll up the bands 76 thereon to move the hand holders 62 and 64 to the left as viewed in FIG. 2. As shown herein that means is simply a knurled hand wheel 84 fixed to the shaft 80 in any suitable manner as by a set screw 86. Also mounted on shaft 80 is a ratchet wheel 88 which cooperates with a pawl 90 which is pivotally mounted on one of the brackets 82. As shown in detail in FIG. 5 pawl 90 is a V-shaped member having an end 92 adapted to interengage with the teeth 94 on the ratchet wheel 88 to prevent rotation of said ratchet wheel in a counter-clockwise direction as viewed in FIG. 5. This is the direction which will permit movement of the hand holders 62 and 64 to the right toward the foot holders 40 and 42 as viewed in FIG. 2. The other portion 96 of pawl 90 extends outwardly of the end of the bracket 82 to make it readily accessible to a finger of the operator. Engaging the portion 96 of pawl 90 is a leaf spring 98 which is fixed to the bracket 82 as by stud 100. The spring 98 biases the pawl into engagement with the ratchet wheel. However, the pressure exerted by the spring 98 may be easily overcome by the force exerted by the finger of the operator to move the pawl 90 out of engagement with the ratchet wheel 88 so as to permit rotation in a counter-clockwise direction.

To further facilitate the rotation of the cylinder 78 in the counter-clockwise direction so as to permit a movement of the hand holders towards the foot holders cylinder 78 is proportioned so that it is shorter than the distance between the brackets 82 and shaft 80 is slidably movable relative to brackets 82. Disposed between one end 102 of cylinder 78 and the confronting bracket is a compression spring 104 which biases the cylinder toward the left as viewed in FIG. 4. This biasing of the cylinder brings the ratchet wheel into alignment with the pawl. However, if it is desired to disengage the ratchet wheel from the pawl the operator need only push on the hand wheel 84 in the direction of spring 102 to cause shaft 80 to slide to the right as viewed in FIG. 4 against the bias of spring 104 and thus permit the ratchet wheel to be moved from its solid line position as viewed in FIG. 4 to its dotted line position as viewed in FIG. 4 in which latter position the ratchet wheel will not engage the pawl. In such a position the cylinder 78 may be readily rotated in either direction without interference by the ratchet and pawl.

In use, the child patient P is disposed on the top surface 20 of device 10 and his feet are inserted into the foot holders 40 and 42, the members 46 being thereafter moved away from the free ends of the looped bands to firmly hold the child's feet in the foot holders. The child is then placed in a horizontal position and the hand holders are moved to the right as viewed in FIG. 2 to permit easy insertion of the child's hands therein. This movement may be effected by compression spring 104 to disengage the ratchet wheel 88 from pawl 90 and manually grasp the hand holders 62 and 64 and moving them to the right. The child's hands are then placed in the hand holders 62 and 64 and the members 68 are then moved to close the hand holders so as to securely hold the child's hands. The hand wheel 84 is then rotated in a clockwise direction with the ratchet wheel 88 in engagement with the pawl. This rotation is continued until some tension is applied to the child. This tension has a unique effect as it not only immobilizes the child but from my own experiences with my device the tension apparently has an extremely relaxing effect on the child so that the child makes no effort to move while under tension and actually enjoys remaining on the device 10 during X-raying.

Of course, care must be taken to prevent the child from being subjected to too great a tension force. In the construction shown this limitation of the amount of force to be applied is accomplished by merely limiting the mechanical advantage obtained by the difference in the diameter of the hand wheel 84 and the diameter of the cylinder 78. If this mechanical advantage is kept to less than about two it is virtually impossible for an operator to turn hand wheel 84 against the pull of the child at a point where said pull will not strain the child. In lieu of the expedient of keeping the mechanical advantage to a minimum the cylinder 78 may be disposed on the shaft 80 with a slip friction fit so that when a certain tension is obtained further rotation of the hand wheel will not cause any additional rotation of the cylinder. However, in view of the fact that the hand wheel is to be grasped by the hand of the operator I have found that a relative proportioning of the diameters of the hand wheel and the cylinder to keep the mechanical advantage below two will suffice to guard against straining the child.

Although the child while under tension appears to be relatively immobilized, in view of the substantial length of the bands 76 there is the possibility that the child can move laterally of the surface 20. To protect against this possibility bands 76 pass through apertures 106 in a cross member 108. Cross member 108 is connected to the surface 20 for sliding movement longitudinally of the table. This connection may be effected by providing the surface 20 with two longitudinally extending slots 110 through which studs 112 pass, the studs being provided with enlarged heads 114 which prevent their passage through the slots. However, the shanks of the studs 112 are of smaller diameter than the width of the slots 110 whereby to permit longitudinal movement of the cross member 108 relative to the device 10. After the child is positioned in the device 10 the cross member is preferably moved close to or into abuting relation with the blocks 74 to thus effectively prevent any lateral movement of the straps 76 relative to the supporting surface 20. Thus, the child is prevented from moving laterally of the device.

With the child in a horizontal position with both his hands and feet connected to the hand holders and foot holders, respectively, the trays 28 and 36, or any one of them, may be moved into position for exposure by X-rays from the X-ray device 14. The X-ray device may be moved to a position on the opposite side of the child's body from the cassette in the tray and the picture may be taken or the child may be exposed with no fear of excessive movement thus insuring highly localized X-ray therapy or a sharp X-ray picture as the case may be. If it is desired to take a picture of the child from front to back the X-ray device may be disposed above the portion of the child's body to be photographed and horizontal tray 36 may be disposed beneath said portion of the child's body. If it is desired to take a picture of the child from side to side, the X-ray machine may be moved downwardly and rotated 90° so that it will confront the side of the child away from the channel member 24 and a cassette disposed in the tray 28 may be slidably moved into alignment with the machine for taking this picture. On occasion it is desired to take an oblique view with the child turned 45° from the horizontal position as shown in FIG. 1. Ths may be accomplished merely by releasing the tension on the child and then disengaging the left or right hand and the corresponding foot and then resubjecting the child to tension. When this is done the child automatically will move into and remain in an oblique position. However, if it is desired to assure that he will remain in said position a triangular wedge may be brought into supporting relation with the back of the child. Furthermore, there are times when it is necessary to X-ray a child with the child in a vertical position. This can be accomplished merely by hanging the device on a suitable bracket on the wall. Such a vertical suspension of the child has been found not to injure him in the least, and, as a matter of fact, the child enjoys it. In all of these positions the child will be completely immobilized and hence clear X-ray pictures may be taken with no difficulty.

It will be obvious to those skilled in the art that device 10 must be made of a radiolucent material. Accordingly, I prefer to use plastic materials and particularly transparent plastic materials, such as, for instance, styrene, although methacrylates, glass and other transparent radiolucent materials are satisfactory. The preference for clear plastic materials is based not only on their high radiolucency but on the fact that the operator at all times can see the location of the cassette carrying trays 28 and 36 and thus need not guess that he has positioned them properly for the pictures to be taken.

While I have herein shown and described the preferred form of the invention and have suggested modifications therein other changes and modifications may be made therein within the scope of the appended claims without departing from the spirit and scope of this invention.

What I claim is:

1. A device for immobilizing a child during X-raying, said device comprising a horizontal surface adapted to support the child in a prone position, means adapted to releasably hold the feet of the child, means adapted to releasably hold the hands of the child, means for moving said hand holding means relative to said foot holding means toward and away from each other for subjecting said child to a mild tension, whereby to immobilize said child, means for movably mounting a horizontally oriented X-ray cassette in a plane below and substantially parallel to said horizontal surface, and means for movably mounting a vertically oriented X-ray cassette in a vertical plane extending parallel to the longitudinal axis of said horizontal surface and being spaced from the line defined by a corresponding hand holding and foot holding means on the opposite side from the other corresponding hand holding and foot holding means.

2. A device for immobilizing a child during X-raying, said device comprising a pair of spaced longitudinally extending vertical supports, a horizontal member fixed to said supports along the tops thereof for supporting the child in a prone position, means adapted to releasably hold the feet of the child, means adapted to releasably hold the hands of the child, means for moving said hand holding means relative to said foot holding means toward and away from each other for subjecting said child to a mild tension, whereby to immobilize said child, track means operatively connected to said vertical supports below said horizontal support for slidably supporting the X-ray cassette, one of said vertical supports being provided with a cut-out portion adapted to permit the passage of a hand therethrough to grasp said aforementioned cassette for slidably moving the same, and a vertically extending channel member operatively connected to the other of said supports for mounting a vertically oriented X-ray cassette for slidable movement in a horizontal direction.

3. A device for immobilizing a child during X-raying, said device comprising a longitudinally extending horizontal member adapted to support the child in a prone position, a pair of means operatively connected to said horizontal member adjacent one of the transverse edges thereof for releasably holding the child's feet, first and second means for releasably holding the child's hands, a pair of longitudinally extending straps, one for each of said hand holding means, connected to each of said hand holding means at one end of said straps, a rotatable member extending across said horizontal member adjacent the other transverse edge thereof, the other end of said straps being connected to said rotatable member, whereby when said rotatable member is rotated in one direction said straps are rolled onto said rotatable member to move said straps longitudinally away from said foot holding means to thus move said hand holding means away from said foot holding means and thereby subject the child to mild tension and when said rotatable member is rotated in the other direction said straps are unrolled off of said rotatable member to permit said straps to move in the opposite direction to relieve the tension on the child, a ratchet wheel mounted for rotation with said rotatable member, a pawl engageable and disengageable with said ratchet wheel for preventing and permitting, respectively, rotation of said rotatable member in said other direction, a transversely extending member mounted for movement longitudinally of said horizontal member, said transverse member being in engagement with said straps for preventing movement thereof transversely of said horizontal member, means for movably mounting a horizontally oriented X-ray cassette in a plane below and substantially parallel to said horizontal member, and means for movably mounting a vertically oriented X-ray cassette in a vertical plane extending parallel to the longitudinal axis of said horizontal surface and being spaced from the line defined by a corresponding hand holding and foot holding means on the opposite side from the other corresponding hand holding and foot holding means.

References Cited in the file of this patent

UNITED STATES PATENTS

| | | |
|---|---|---|
| 1,576,781 | Philips | Mar. 16, 1926 |
| 2,208,258 | Grobe | July 16, 1940 |
| 2,266,296 | Anderson | Dec. 16, 1941 |
| 2,459,729 | Treace | Jan. 18, 1949 |
| 2,845,314 | Long | July 29, 1958 |